(No Model.)
J. R. WOOD & C. C. NICHOLLS.
FOOT BLOCK AND CASTER ATTACHMENT FOR FURNITURE.
No. 371,116. Patented Oct. 4, 1887.
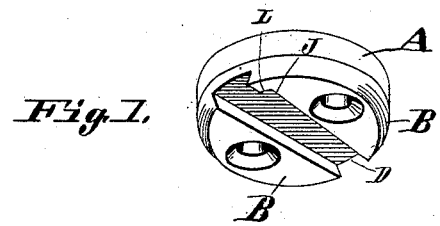
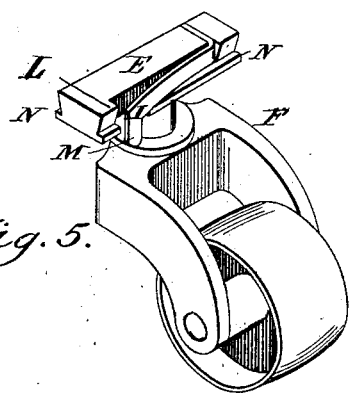
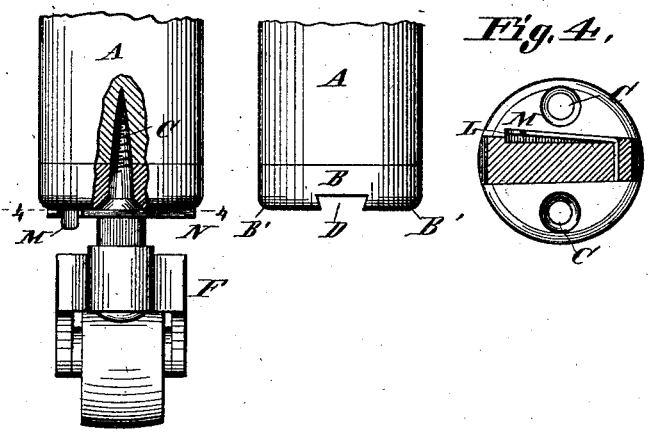

UNITED STATES PATENT OFFICE.

JOHN R. WOOD, OF ASPEN, COLORADO, AND CHARLES C. NICHOLLS, OF ST. LOUIS, MISSOURI.

FOOT-BLOCK AND CASTER ATTACHMENT FOR FURNITURE.

SPECIFICATION forming part of Letters Patent No. 371,116, dated October 4, 1887.

Application filed October 14, 1886. Serial No. 216,257. (No model.)

*To all whom it may concern:*

Be it known that we, JOHN R. WOOD, of Aspen, in the county of Pitkin and State of Colorado, and CHARLES C. NICHOLLS, of the city of St. Louis, in the State of Missouri, have invented a certain new and useful Improvement in Foot-Blocks and Caster Attachments for Furniture, of which the following is a full, clear, and exact description, reference being had to the accompanying drawings, forming part of this specification, and in which—

Figure 1 is a perspective view representing the foot-block secured to the lower end of a portion of a leg of a piece of furniture. Fig. 2 is a side view showing the lower end of one of the legs and the caster in place. Fig. 3 is a detail view of one of the legs with the foot-block in place and the caster removed. Fig. 4 is a section taken on line 4 4, Fig. 2. Fig. 5 is a perspective view of the caster and the tenon for engaging the groove in the foot-block.

Our invention relates to certain improvements in foot-blocks and caster attachments for furniture; and our invention consists in features of novelty hereinafter fully described, and pointed out in the claims.

Referring to the drawings, A represents the lower end of a leg of a piece of furniture—such as a table, book-case, wash-stand, or other article. Secured to the bottom of this leg is a foot-piece, B, preferably being secured by screws C. The lower edge or corner of this foot-piece is made rounding, as shown at B', so that the furniture may be moved from place to place, when the caster is off, without danger of tearing the carpet or without danger of marking or cutting the surface upon which the article rests, and also the article can be moved with greater ease than when this lower edge is made sharp, as has been the practice heretofore.

D represents a dovetail groove formed in the foot-block. It is made tapering, as shown in Figs. 1 and 4, and receives a dovetail tenon, E, formed upon the upper end of the caster F. The tenon is also made tapering, so that when it is placed in the groove it will be prevented from moving in the direction in which it is inserted farther than is necessary for its reception by the groove. When it is inserted, it is prevented from moving out of the groove in the opposite direction to which it is inserted by means of a spring, I, fitting in a recess, J, in one wall of the dovetail groove, the end of the spring fitting against a shoulder, L, formed by said recess.

It will be seen that the caster will be held rigidly from moving in either direction in the foot-block, and that it can be readily and easily removed by simply pressing upon the spring I to move its outer end from behind the shoulder L. For this purpose the spring I is provided with a lip or projection, M, that extends down beyond the tenon on the caster, as shown in Fig. 2.

In addition to the tenon, a wide bearing is obtained by forming ribs N at the base of the tenon, which bear against the foot-block on each side of the groove.

This invention provides a cheap, quick, and secure means of attaching casters to legs of furniture, and when the caster is off provides a bearing for the leg upon the support that will not mar the support when the furniture is moved.

We claim as our invention—

1. In combination with a caster having a tapering dovetail tenon, a foot-piece having a tapering dovetail groove to receive the tenon on the caster, and a spring for holding the tenon within the groove, substantially as set forth.

2. In combination with a caster having a tapering dovetail tenon and a spring secured to said tenon with a projection, M, a foot-piece having a tapering dovetail groove provided with a recess forming a shoulder, L, substantially as and for the purpose set forth.

JNO. R. WOOD.
CHARLES C. NICHOLLS.

Witnesses to the signature of Jno. R. Wood:
J. J. EARLY,
H. A. DAY.

Witnesses to the signature of Charles C. Nicholls:
GEO. H. KNIGHT,
EDW. S. KNIGHT.